US011112083B2

United States Patent
Raleigh et al.

(10) Patent No.: US 11,112,083 B2
(45) Date of Patent: *Sep. 7, 2021

(54) OPTIC MEMBER FOR AN LED LIGHT FIXTURE

(71) Applicant: IDEAL Industries Lighting LLC, Racine, WI (US)

(72) Inventors: Craig Raleigh, Racine, WI (US); Kurt S. Wilcox, Libertyville, IL (US)

(73) Assignee: IDEAL Industries Lighting LLC, Racine, WI (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/557,420

(22) Filed: Aug. 30, 2019

(65) Prior Publication Data

US 2019/0383464 A1 Dec. 19, 2019

Related U.S. Application Data

(63) Continuation of application No. 13/843,928, filed on Mar. 15, 2013, now Pat. No. 10,400,984.

(51) Int. Cl.
*F21V 5/00* (2018.01)
*F21V 5/04* (2006.01)
(Continued)

(52) U.S. Cl.
CPC .............. *F21V 5/007* (2013.01); *B29C 45/16* (2013.01); *B29D 11/0074* (2013.01); *F21V 5/04* (2013.01);
(Continued)

(58) Field of Classification Search
CPC . F21V 5/007; F21V 5/04; B29C 45/16; B29D 11/0074; F21Y 2105/10;
(Continued)

(56) References Cited

U.S. PATENT DOCUMENTS

| 3,138,147 A | 6/1964 | Bancel |
| 3,142,207 A | 7/1964 | Grob |

(Continued)

FOREIGN PATENT DOCUMENTS

| DE | 20014114 U1 | 11/2000 |
| DE | 20107425 U1 | 7/2001 |

(Continued)

OTHER PUBLICATIONS

Author Unknown, "Transformations in Lighting: The Eighth Annual Solid-State Lighting R&D Workshop," Solid-State Lighting, Feb. 2011, Office of Energy Efficiency & Renewable Energy, 13 pages.
(Continued)

*Primary Examiner* — Erin Kryukova
(74) *Attorney, Agent, or Firm* — Withrow & Terranova, PLLC (57) ABSTRACT

A lens for directing light from an LED light source. The lens is formed by a plurality of layers and has a light-receiving inner-surface defining a pair of cavities. A portion of the inner-surface which defines one of the cavities is at least partially formed by an innermost layer of the plurality of layers. At least a portion of another of the plurality of layers extends inwardly between the pair of cavities. Another aspect of this invention is an optic member including a plurality of the lenses for directing light received from a plurality of spaced apart LED light sources.

16 Claims, 8 Drawing Sheets

(51) Int. Cl.
  *B29D 11/00* (2006.01)
  *B29C 45/16* (2006.01)
  *F21Y 115/10* (2016.01)
  *B29L 11/00* (2006.01)
  *F21Y 105/10* (2016.01)
  *B29K 83/00* (2006.01)

(52) U.S. Cl.
  CPC ............... *B29K 2083/005* (2013.01); *B29K 2995/0031* (2013.01); *B29L 2011/0016* (2013.01); *F21Y 2105/10* (2016.08); *F21Y 2115/10* (2016.08)

(58) Field of Classification Search
  CPC .......... F21Y 2115/10; B29K 2083/005; B29K 2995/031; B29L 2011/0016
  See application file for complete search history.

(56) References Cited

U.S. PATENT DOCUMENTS

| | | |
|---|---|---|
| 3,372,740 A | 3/1968 | Kastovich et al. |
| 3,532,871 A | 10/1970 | Shipman |
| 3,560,598 A | 2/1971 | Neefe |
| 3,760,237 A | 9/1973 | Jaffe |
| 4,146,297 A | 3/1979 | Alferness et al. |
| 4,441,787 A | 4/1984 | Lichtenberger |
| 4,714,983 A | 12/1987 | Lang |
| 4,808,101 A | 2/1989 | Schad et al. |
| 4,914,553 A | 4/1990 | Hamada et al. |
| 4,954,930 A | 9/1990 | Maegawa et al. |
| 4,977,486 A | 12/1990 | Gotoh |
| 5,005,108 A | 4/1991 | Pristash et al. |
| 5,009,483 A | 4/1991 | Rockwell, III |
| 5,014,165 A | 5/1991 | Naganawa |
| 5,026,161 A | 6/1991 | Werner |
| 5,040,098 A | 8/1991 | Tanaka et al. |
| 5,047,761 A | 9/1991 | Sell |
| 5,061,404 A | 10/1991 | Wu et al. |
| 5,097,258 A | 3/1992 | Iwaki |
| 5,113,177 A | 5/1992 | Cohen |
| 5,113,472 A | 5/1992 | Gualtieri et al. |
| 5,171,080 A | 12/1992 | Bathurst |
| 5,175,787 A | 12/1992 | Gualtieri et al. |
| 5,186,865 A | 2/1993 | Wu et al. |
| 5,223,275 A | 6/1993 | Gellert |
| 5,245,689 A | 9/1993 | Gualtieri |
| 5,253,317 A | 10/1993 | Allen et al. |
| 5,295,019 A | 3/1994 | Rapoport |
| 5,309,544 A | 5/1994 | Saxe |
| 5,359,687 A | 10/1994 | McFarland et al. |
| 5,359,691 A | 10/1994 | Tai et al. |
| 5,396,350 A | 3/1995 | Beeson et al. |
| 5,398,179 A | 3/1995 | Pacheco |
| 5,400,224 A | 3/1995 | DuNah et al. |
| 5,428,468 A | 6/1995 | Zimmerman et al. |
| 5,461,547 A | 10/1995 | Ciupke et al. |
| 5,462,700 A | 10/1995 | Beeson et al. |
| 5,481,385 A | 1/1996 | Zimmerman et al. |
| 5,485,317 A | 1/1996 | Perissinotto et al. |
| 5,494,615 A | 2/1996 | Lee |
| 5,506,924 A | 4/1996 | Inoue |
| 5,521,725 A | 5/1996 | Beeson et al. |
| 5,521,726 A | 5/1996 | Zimmerman et al. |
| 5,528,720 A | 6/1996 | Winston et al. |
| 5,537,304 A | 7/1996 | Klaus |
| 5,541,039 A | 7/1996 | McFarland et al. |
| 5,548,670 A | 8/1996 | Koike |
| 5,553,092 A | 9/1996 | Bruce et al. |
| 5,555,109 A | 9/1996 | Zimmerman et al. |
| 5,555,160 A | 9/1996 | Tawara et al. |
| 5,555,329 A | 9/1996 | Kuper et al. |
| 5,572,411 A | 11/1996 | Watai et al. |
| 5,577,492 A | 11/1996 | Parkyn, Jr. et al. |
| 5,584,556 A | 12/1996 | Yokoyama et al. |
| 5,598,280 A | 1/1997 | Nishio et al. |
| 5,598,281 A | 1/1997 | Zimmerman et al. |
| 5,613,751 A | 3/1997 | Parker et al. |
| 5,613,770 A | 3/1997 | Chin, Jr. et al. |
| 5,657,408 A | 8/1997 | Ferm et al. |
| 5,658,066 A | 8/1997 | Hirsch |
| 5,659,410 A | 8/1997 | Koike et al. |
| 5,661,210 A | 8/1997 | Burns et al. |
| 5,676,453 A | 10/1997 | Parkyn, Jr. et al. |
| 5,676,457 A | 10/1997 | Simon |
| 5,677,702 A | 10/1997 | Inoue et al. |
| 5,685,634 A | 11/1997 | Mulligan |
| 5,696,865 A | 12/1997 | Beeson et al. |
| 5,702,176 A | 12/1997 | Engle |
| 5,718,497 A | 2/1998 | Yokoyama et al. |
| 5,719,619 A | 2/1998 | Hattori et al. |
| 5,727,107 A | 3/1998 | Umemoto et al. |
| 5,735,590 A | 4/1998 | Kashima et al. |
| 5,739,931 A | 4/1998 | Zimmerman et al. |
| 5,748,828 A | 5/1998 | Steiner et al. |
| 5,761,355 A | 6/1998 | Kuper et al. |
| 5,769,522 A | 6/1998 | Kaneko et al. |
| 5,771,039 A | 6/1998 | Ditzik |
| 5,777,857 A | 7/1998 | Degelmann |
| 5,806,955 A | 9/1998 | Parkyn, Jr. et al. |
| 5,812,714 A | 9/1998 | Hulse |
| 5,818,555 A | 10/1998 | Yokoyama et al. |
| 5,836,676 A | 11/1998 | Ando et al. |
| 5,839,823 A | 11/1998 | Hou et al. |
| 5,850,498 A | 12/1998 | Shacklette et al. |
| 5,854,872 A | 12/1998 | Tai |
| 5,863,113 A | 1/1999 | Oe et al. |
| 5,872,883 A | 2/1999 | Ohba et al. |
| 5,897,201 A | 4/1999 | Simon |
| 5,914,759 A | 6/1999 | Higuchi et al. |
| 5,914,760 A | 6/1999 | Daiku |
| 5,949,933 A | 9/1999 | Steiner et al. |
| 5,954,423 A | 9/1999 | Logan et al. |
| 5,961,198 A | 10/1999 | Hira et al. |
| 5,967,637 A | 10/1999 | Ishikawa et al. |
| 5,974,214 A | 10/1999 | Shacklette et al. |
| 5,997,148 A | 12/1999 | Ohkawa |
| 5,999,281 A | 12/1999 | Abbott et al. |
| 5,999,685 A | 12/1999 | Goto et al. |
| 6,007,209 A | 12/1999 | Pelka |
| 6,043,951 A | 3/2000 | Lee |
| 6,044,196 A | 3/2000 | Winston et al. |
| 6,079,838 A | 6/2000 | Parker et al. |
| 6,097,549 A | 8/2000 | Jenkins et al. |
| 6,107,222 A | 8/2000 | Joseph et al. |
| 6,123,889 A | 9/2000 | Katagari et al. |
| 6,134,092 A | 10/2000 | Pelka et al. |
| 6,139,176 A | 10/2000 | Hulse et al. |
| 6,151,089 A | 11/2000 | Yang et al. |
| 6,155,692 A | 12/2000 | Ohkawa |
| 6,161,939 A | 12/2000 | Bansbach |
| 6,164,790 A | 12/2000 | Lee |
| 6,164,791 A | 12/2000 | Gwo-Juh et al. |
| 6,167,182 A | 12/2000 | Shinohara et al. |
| 6,206,535 B1 | 3/2001 | Hattori et al. |
| 6,231,200 B1 | 5/2001 | Shinohara et al. |
| 6,232,592 B1 | 5/2001 | Sugiyama |
| 6,241,363 B1 | 6/2001 | Lee |
| 6,257,737 B1 | 7/2001 | Marshall et al. |
| 6,259,854 B1 | 7/2001 | Shinji et al. |
| D446,333 S | 8/2001 | Frois |
| 6,304,693 B1 | 10/2001 | Buelow, II et al. |
| 6,310,704 B1 | 10/2001 | Dogan et al. |
| 6,379,016 B1 | 4/2002 | Boyd et al. |
| 6,379,017 B2 | 4/2002 | Nakabayashi et al. |
| 6,395,201 B1 | 5/2002 | Hunt et al. |
| 6,400,086 B1 | 6/2002 | Huter |
| 6,421,103 B2 | 7/2002 | Yamaguchi |
| 6,443,594 B1 | 9/2002 | Marshall et al. |
| 6,461,007 B1 | 10/2002 | Akaoka |
| 6,473,554 B1 | 10/2002 | Pelka et al. |
| 6,480,307 B1 | 11/2002 | Yang |
| 6,485,157 B2 | 11/2002 | Ohkawa |
| 6,499,870 B1 | 12/2002 | Zwick et al. |
| 6,502,956 B1 | 1/2003 | Wu |

(56) References Cited

U.S. PATENT DOCUMENTS

| | | |
|---|---|---|
| 6,508,563 B2 | 1/2003 | Parker et al. |
| 6,523,986 B1 | 2/2003 | Hoffmann |
| 6,541,720 B2 | 4/2003 | Gerald et al. |
| 6,554,451 B1 | 4/2003 | Keuper |
| 6,568,819 B1 | 5/2003 | Yamazaki et al. |
| 6,582,103 B1 | 6/2003 | Popovich et al. |
| 6,585,356 B1 | 7/2003 | Ohkawa |
| 6,598,998 B2 | 7/2003 | West et al. |
| 6,606,199 B2 | 8/2003 | Wang |
| 6,612,723 B2 | 9/2003 | Futhey et al. |
| 6,616,290 B2 | 9/2003 | Ohkawa |
| 6,629,764 B1 | 10/2003 | Uehara |
| 6,633,722 B1 | 10/2003 | Kohara et al. |
| 6,634,772 B2 | 10/2003 | Yaphe et al. |
| 6,636,363 B2 | 10/2003 | Kaminsky et al. |
| 6,647,199 B1 | 11/2003 | Pelka et al. |
| 6,652,109 B1 | 11/2003 | Nakamura |
| 6,659,628 B2 | 12/2003 | Del Campo |
| 6,671,452 B2 | 12/2003 | Winston et al. |
| 6,676,284 B1 | 1/2004 | Wilson |
| 6,678,021 B2 | 1/2004 | Ohkawa |
| 6,679,621 B2 | 1/2004 | West et al. |
| 6,712,481 B2 | 3/2004 | Parker et al. |
| 6,724,529 B2 | 4/2004 | Sinkoff |
| 6,724,543 B1 | 4/2004 | Chinniah et al. |
| 6,727,965 B1 | 4/2004 | Kubota |
| 6,752,505 B2 | 6/2004 | Parker et al. |
| 6,755,546 B2 | 6/2004 | Ohkawa |
| 6,758,582 B1 | 7/2004 | Hsiao et al. |
| 6,775,460 B2 | 8/2004 | Steiner et al. |
| 6,796,676 B2 | 9/2004 | Severtson et al. |
| 6,802,628 B2 | 10/2004 | Kuo |
| 6,840,656 B2 | 1/2005 | Kuo |
| 6,845,212 B2 | 1/2005 | Gardiner et al. |
| 6,876,408 B2 | 4/2005 | Yamaguchi |
| 6,894,740 B2 | 5/2005 | Ohkawa |
| 6,896,381 B2 | 5/2005 | Benitez et al. |
| 6,924,943 B2 | 8/2005 | Minano et al. |
| 6,942,360 B2 | 9/2005 | Chou et al. |
| D511,221 S | 11/2005 | Zucker |
| 6,974,241 B2 | 12/2005 | Hara et al. |
| 6,992,335 B2 | 1/2006 | Ohkawa |
| D518,911 S | 4/2006 | Lee |
| 7,025,482 B2 | 4/2006 | Yamashita et al. |
| 7,046,318 B2 | 5/2006 | Yu et al. |
| 7,046,905 B1 | 5/2006 | Gardiner et al. |
| 7,056,567 B2 | 6/2006 | O'Neill et al. |
| 7,063,430 B2 | 6/2006 | Greiner |
| 7,072,096 B2 | 7/2006 | Holman et al. |
| 7,083,313 B2 | 8/2006 | Smith |
| 7,085,460 B2 | 8/2006 | Leu et al. |
| 7,090,370 B2 | 8/2006 | Clark et al. |
| 7,090,389 B2 | 8/2006 | Parker et al. |
| 7,097,341 B2 | 8/2006 | Tsai |
| 7,106,528 B2 | 9/2006 | Ohmori et al. |
| 7,118,253 B1 | 10/2006 | Simon |
| D532,532 S | 11/2006 | Maxik |
| 7,131,764 B2 | 11/2006 | Hsu et al. |
| 7,152,985 B2 | 12/2006 | Benitez et al. |
| 7,160,010 B1 | 1/2007 | Chinniah et al. |
| 7,160,015 B2 | 1/2007 | Parker |
| 7,168,841 B2 | 1/2007 | Hsieh et al. |
| 7,175,330 B1 | 2/2007 | Chen |
| 7,178,941 B2 | 2/2007 | Roberge et al. |
| 7,182,480 B2 | 2/2007 | Kan |
| 7,192,174 B2 | 3/2007 | Myoung |
| 7,204,634 B2 | 4/2007 | Chen et al. |
| 7,209,628 B2 | 4/2007 | Winston et al. |
| 7,222,995 B1 | 5/2007 | Bayat et al. |
| 7,223,004 B2 | 5/2007 | Chen et al. |
| D544,110 S | 6/2007 | Hooker et al. |
| 7,246,931 B2 | 7/2007 | Hsieh et al. |
| 7,265,800 B2 | 9/2007 | Jagt et al. |
| 7,273,299 B2 | 9/2007 | Parkyn et al. |
| 7,283,313 B2 | 10/2007 | Tamaoki et al. |
| 7,284,871 B2 | 10/2007 | Don et al. |
| 7,292,767 B2 | 11/2007 | Cheng |
| D563,036 S | 2/2008 | Miyairi et al. |
| D565,778 S | 4/2008 | Pedersen |
| D566,300 S | 4/2008 | Lo |
| 7,364,342 B2 | 4/2008 | Parker et al. |
| D568,529 S | 5/2008 | Colleran, Jr. et al. |
| D570,025 S | 5/2008 | Walker |
| D573,292 S | 7/2008 | Zheng et al. |
| 7,393,124 B1 | 7/2008 | Williams |
| 7,399,108 B2 | 7/2008 | Ayabe et al. |
| 7,400,809 B2 | 7/2008 | Erben et al. |
| 7,404,660 B2 | 7/2008 | Parker |
| D575,898 S | 8/2008 | Fran et al. |
| 7,407,303 B2 | 8/2008 | Wanninger et al. |
| 7,422,357 B1 | 9/2008 | Chang |
| D581,555 S | 11/2008 | To et al. |
| 7,458,714 B2 | 12/2008 | Chang |
| 7,465,074 B2 | 12/2008 | Blumel |
| D584,838 S | 1/2009 | To et al. |
| 7,486,854 B2 | 2/2009 | Ostrand et al. |
| 7,488,093 B1 | 2/2009 | Huang et al. |
| D587,839 S | 3/2009 | Guercio |
| D589,195 S | 3/2009 | Sabemig |
| 7,513,672 B2 | 4/2009 | Parker |
| 7,520,650 B2 | 4/2009 | Smith |
| 7,534,013 B1 | 5/2009 | Simon |
| 7,559,672 B1 | 7/2009 | Parkyn et al. |
| 7,566,148 B2 | 7/2009 | Noh et al. |
| 7,566,159 B2 | 7/2009 | Oon et al. |
| 7,587,117 B2 | 9/2009 | Winston et al. |
| D604,002 S | 11/2009 | Santoro |
| 7,614,764 B2 | 11/2009 | Williams et al. |
| 7,626,655 B2 | 12/2009 | Yamazaki et al. |
| 7,628,508 B2 | 12/2009 | Kita et al. |
| 7,639,918 B2 | 12/2009 | Sayers et al. |
| 7,641,363 B1 | 1/2010 | Chang et al. |
| 7,648,256 B2 | 1/2010 | Shiratsuchi et al. |
| D609,384 S | 2/2010 | Gray et al. |
| D612,527 S | 3/2010 | Espiau et al. |
| 7,674,018 B2 | 3/2010 | Holder et al. |
| 7,682,533 B2 | 3/2010 | Iatan |
| 7,682,853 B2 | 3/2010 | Ashida |
| 7,696,527 B2 | 4/2010 | Uemoto et al. |
| 7,703,950 B2 | 4/2010 | Ewert et al. |
| 7,703,967 B2 | 4/2010 | Parker |
| D615,232 S | 5/2010 | Xiao et al. |
| D616,145 S | 5/2010 | Boissevain |
| 7,710,663 B2 | 5/2010 | Barnes et al. |
| 7,722,196 B2 | 5/2010 | Caire et al. |
| 7,722,224 B1 | 5/2010 | Coleman et al. |
| 7,722,241 B2 | 5/2010 | Chang |
| 7,724,321 B2 | 5/2010 | Hsieh et al. |
| D617,489 S | 6/2010 | Santoro |
| D618,842 S | 6/2010 | Ngai et al. |
| 7,736,019 B2 | 6/2010 | Shimada et al. |
| 7,736,045 B2 | 6/2010 | Yamashita et al. |
| 7,750,982 B2 | 7/2010 | Nelson et al. |
| 7,753,551 B2 | 7/2010 | Yaphe et al. |
| 7,758,227 B1 | 7/2010 | Coleman |
| 7,760,290 B2 | 7/2010 | Kang et al. |
| 7,762,705 B2 | 7/2010 | Sakai et al. |
| D622,894 S | 8/2010 | Ngai et al. |
| 7,766,515 B2 | 8/2010 | Condon et al. |
| 7,776,236 B2 | 8/2010 | Shih et al. |
| 7,780,306 B2 | 8/2010 | Hoshi |
| 7,784,954 B1 | 8/2010 | Coleman |
| D623,793 S | 9/2010 | Ngai et al. |
| 7,798,695 B2 | 9/2010 | Parker |
| D626,260 S | 10/2010 | Wei |
| 7,806,581 B2 | 10/2010 | Lee |
| 7,810,960 B2 | 10/2010 | Soderman et al. |
| 7,810,968 B1 | 10/2010 | Walker et al. |
| 7,813,131 B2 | 10/2010 | Liang |
| 7,821,982 B2 | 10/2010 | Chen et al. |
| D627,913 S | 11/2010 | Gielen |
| D628,319 S | 11/2010 | Yoshinobu et al. |
| 7,826,698 B1 | 11/2010 | Meir et al. |
| D629,129 S | 12/2010 | Lin et al. |

(56) References Cited

U.S. PATENT DOCUMENTS

| | | |
|---|---|---|
| 7,850,357 B2 | 12/2010 | Kim et al. |
| 7,857,619 B2 | 12/2010 | Liu |
| D630,347 S | 1/2011 | Pei et al. |
| D630,775 S | 1/2011 | Pan |
| D631,577 S | 1/2011 | Yoshinobu et al. |
| D631,601 S | 1/2011 | Lodhie |
| 7,866,871 B2 | 1/2011 | Couzin et al. |
| D633,636 S | 3/2011 | Gielen |
| D634,056 S | 3/2011 | Hokazono et al. |
| 7,905,646 B2 | 3/2011 | Adachi et al. |
| 7,906,892 B2 | 3/2011 | Choi et al. |
| 7,907,804 B2 | 3/2011 | Meir et al. |
| 7,914,192 B2 | 3/2011 | Coleman |
| 7,914,193 B2 | 3/2011 | Peifer et al. |
| 7,914,196 B2 | 3/2011 | Parker et al. |
| 7,918,590 B1 | 4/2011 | Li et al. |
| 7,929,816 B2 | 4/2011 | Meir et al. |
| 7,934,851 B1 | 5/2011 | Boissevain et al. |
| 7,967,477 B2 | 6/2011 | Bloemen et al. |
| 7,969,531 B1 | 6/2011 | Li et al. |
| D641,923 S | 7/2011 | Radchenko et al. |
| 7,976,204 B2 | 7/2011 | Li et al. |
| D642,725 S | 8/2011 | Kong et al. |
| 7,991,257 B1 | 8/2011 | Coleman |
| 7,997,784 B2 | 8/2011 | Tsai |
| 8,002,450 B2 | 8/2011 | Van Ostrand et al. |
| D645,194 S | 9/2011 | Budike, Jr. et al. |
| D646,406 S | 10/2011 | Tsai et al. |
| 8,033,674 B1 | 10/2011 | Coleman et al. |
| 8,033,706 B1 | 10/2011 | Kelly et al. |
| 8,038,308 B2 | 10/2011 | Greiner |
| 8,047,696 B2 | 11/2011 | Ijzerman et al. |
| 8,052,316 B2 | 11/2011 | Lee |
| 8,054,409 B2 | 11/2011 | Hsieh et al. |
| 8,061,877 B2 | 11/2011 | Chang |
| 8,064,743 B2 | 11/2011 | Meir et al. |
| 8,067,884 B2 | 11/2011 | Li |
| 8,075,157 B2 | 12/2011 | Zhang et al. |
| 8,087,807 B2 | 1/2012 | Liu et al. |
| 8,092,068 B2 | 1/2012 | Parker et al. |
| 8,096,671 B1 | 1/2012 | Cronk et al. |
| 8,096,681 B2 | 1/2012 | Fang et al. |
| D654,618 S | 2/2012 | Kong et al. |
| 8,113,704 B2 | 2/2012 | Bae et al. |
| 8,128,272 B2 | 3/2012 | Fine et al. |
| 8,129,731 B2 | 3/2012 | Vissenberg et al. |
| 8,152,339 B2 | 4/2012 | Morgan |
| 8,152,352 B2 | 4/2012 | Richardson |
| 8,162,524 B2 | 4/2012 | Van Ostrand et al. |
| D659,880 S | 5/2012 | Maxik et al. |
| 8,172,447 B2 | 5/2012 | Meir et al. |
| 8,177,408 B1 | 5/2012 | Coleman |
| 8,182,128 B2 | 5/2012 | Meir et al. |
| 8,186,847 B2 | 5/2012 | Hu et al. |
| D662,255 S | 6/2012 | Klus |
| D662,256 S | 6/2012 | Klus |
| D662,643 S | 6/2012 | Takahashi et al. |
| 8,192,051 B2 | 6/2012 | Dau et al. |
| 8,198,109 B2 | 6/2012 | Lerman et al. |
| 8,210,716 B2 | 7/2012 | Lerman et al. |
| 8,215,814 B2 | 7/2012 | Marcoux |
| 8,218,920 B2 | 7/2012 | Ostrand et al. |
| 8,220,955 B2 | 7/2012 | Kwak et al. |
| 8,220,980 B2 | 7/2012 | Gingrich, III |
| 8,226,287 B2 | 7/2012 | Teng et al. |
| 8,231,256 B1 | 7/2012 | Coleman et al. |
| 8,231,258 B2 | 7/2012 | Kim et al. |
| 8,231,259 B2 | 7/2012 | Keller et al. |
| 8,235,547 B2 | 8/2012 | Hofmann |
| 8,242,518 B2 | 8/2012 | Lerman et al. |
| 8,246,187 B2 | 8/2012 | Cheong et al. |
| 8,246,197 B2 | 8/2012 | Huang |
| 8,249,408 B2 | 8/2012 | Coleman |
| 8,258,524 B2 | 9/2012 | Tan et al. |
| 8,272,756 B1 | 9/2012 | Patrick |
| 8,272,770 B2 | 9/2012 | Richardson |
| D668,370 S | 10/2012 | Guercio et al. |
| D669,624 S | 10/2012 | Daniels |
| 8,277,106 B2 | 10/2012 | Van Gorkom et al. |
| 8,282,261 B2 | 10/2012 | Pance et al. |
| 8,283,853 B2 | 10/2012 | Yan et al. |
| 8,287,152 B2 | 10/2012 | Gill |
| 8,292,482 B2 | 10/2012 | Harbers et al. |
| 8,294,165 B2 | 10/2012 | Hattori et al. |
| 8,297,801 B2 | 10/2012 | Coushaine et al. |
| 8,297,818 B2 | 10/2012 | Richardson |
| D670,422 S | 11/2012 | Siekmann |
| D670,856 S | 11/2012 | Butler et al. |
| 8,314,566 B2 | 11/2012 | Steele et al. |
| 8,317,363 B2 | 11/2012 | Zheng |
| 8,317,366 B2 | 11/2012 | Dalton et al. |
| 8,328,403 B1 | 12/2012 | Morgan et al. |
| 8,328,406 B2 | 12/2012 | Zimmermann |
| 8,330,176 B2 | 12/2012 | Thompson et al. |
| 8,331,746 B2 | 12/2012 | Bogner et al. |
| 8,338,199 B2 | 12/2012 | Lerman et al. |
| 8,338,839 B2 | 12/2012 | Lerman et al. |
| 8,338,840 B2 | 12/2012 | Lerman et al. |
| 8,338,841 B2 | 12/2012 | Lerman et al. |
| 8,338,842 B2 | 12/2012 | Lerman et al. |
| 8,344,397 B2 | 1/2013 | Lerman et al. |
| 8,348,446 B2 | 1/2013 | Nakamura |
| 8,348,461 B2 | 1/2013 | Wilcox et al. |
| 8,353,606 B2 | 1/2013 | Jeong |
| 8,369,678 B2 | 2/2013 | Chakmakjian et al. |
| 8,382,354 B2 | 2/2013 | Kim et al. |
| 8,382,387 B1 | 2/2013 | Sandoval |
| D677,806 S | 3/2013 | Jiang et al. |
| 8,388,173 B2 | 3/2013 | Sloan et al. |
| 8,388,190 B2 | 3/2013 | Li et al. |
| 8,398,259 B2 | 3/2013 | Kwak et al. |
| 8,398,262 B2 | 3/2013 | Sloan et al. |
| D679,437 S | 4/2013 | Watt |
| D679,444 S | 4/2013 | Vasylyev |
| D679,843 S | 4/2013 | Hsu et al. |
| D681,262 S | 4/2013 | Lee |
| 8,408,737 B2 | 4/2013 | Wright et al. |
| 8,410,726 B2 | 4/2013 | Dau et al. |
| 8,412,010 B2 | 4/2013 | Ghosh et al. |
| 8,414,154 B2 | 4/2013 | Dau et al. |
| 8,419,219 B2 | 4/2013 | Yamamoto |
| 8,419,224 B2 | 4/2013 | Wan-Chih et al. |
| 8,430,536 B1 | 4/2013 | Zhao |
| 8,430,548 B1 | 4/2013 | Kelly et al. |
| 8,432,628 B2 | 4/2013 | Shiau et al. |
| 8,434,892 B2 | 5/2013 | Zwak et al. |
| 8,434,893 B2 | 5/2013 | Boyer et al. |
| 8,434,912 B2 | 5/2013 | Holder et al. |
| 8,434,913 B2 | 5/2013 | Vissenberg |
| 8,434,914 B2 | 5/2013 | Li et al. |
| 8,449,128 B2 | 5/2013 | Ko et al. |
| 8,449,142 B1 | 5/2013 | Martin et al. |
| D684,296 S | 6/2013 | Henderson et al. |
| 8,454,218 B2 | 6/2013 | Wang et al. |
| 8,459,848 B2 | 6/2013 | Marley |
| 8,461,602 B2 | 6/2013 | Lerman et al. |
| 8,469,559 B2 | 6/2013 | Williams |
| 8,475,010 B2 | 7/2013 | Vissenberg et al. |
| 8,485,684 B2 | 7/2013 | Lou et al. |
| 8,506,112 B1 | 8/2013 | Dau et al. |
| 8,534,896 B2 | 9/2013 | Boonekamp |
| 8,534,901 B2 | 9/2013 | Panagotacos et al. |
| 8,545,049 B2 | 10/2013 | Davis et al. |
| 8,547,022 B2 | 10/2013 | Summerford et al. |
| 8,567,983 B2 | 10/2013 | Boyer et al. |
| 8,567,986 B2 | 10/2013 | Szprengiel et al. |
| D694,449 S | 11/2013 | Walker et al. |
| 8,573,823 B2 | 11/2013 | Dau et al. |
| 8,585,253 B2 | 11/2013 | Duong et al. |
| 8,593,070 B2 | 11/2013 | Wang et al. |
| D695,442 S | 12/2013 | Speier et al. |
| D695,447 S | 12/2013 | Speier et al. |
| 8,598,778 B2 | 12/2013 | Mien et al. |
| 8,602,586 B1 | 12/2013 | Dau et al. |

(56) References Cited

U.S. PATENT DOCUMENTS

| | | | |
|---|---|---|---|
| 8,602,605 B2 | 12/2013 | Park et al. |
| 8,608,351 B2 | 12/2013 | Peifer |
| 8,632,214 B1 | 1/2014 | Tickner et al. |
| 8,641,219 B1 | 2/2014 | Johnson et al. |
| 8,657,479 B2 | 2/2014 | Morgan et al. |
| 8,690,382 B2 | 4/2014 | Farmer |
| 8,724,052 B2 | 5/2014 | Hsieh et al. |
| 8,755,005 B2 | 6/2014 | Bierhuizen et al. |
| 8,771,577 B2 | 7/2014 | Basin et al. |
| 8,814,392 B1 | 8/2014 | Lipowsky et al. |
| 8,820,963 B2 | 9/2014 | Olsen et al. |
| 8,833,999 B2 | 9/2014 | Wang et al. |
| 8,864,360 B2 | 10/2014 | Parker et al. |
| 8,870,431 B2 | 10/2014 | Lin et al. |
| 8,882,323 B2 | 11/2014 | Solomon et al. |
| 8,891,171 B2 | 11/2014 | Choquet et al. |
| 8,899,786 B1 | 12/2014 | Moghal et al. |
| 8,905,569 B2 | 12/2014 | Thomas et al. |
| 8,915,611 B2 | 12/2014 | Zhang |
| 8,917,962 B1 | 12/2014 | Nichol et al. |
| 9,915,410 B2 | 3/2018 | Fork et al. |
| 2001/0019479 A1 | 9/2001 | Nakabayashi et al. |
| 2002/0034081 A1 | 3/2002 | Serizawa |
| 2002/0061178 A1 | 5/2002 | Winston et al. |
| 2002/0172039 A1 | 11/2002 | Inditsky |
| 2003/0169504 A1 | 9/2003 | Kaminsky et al. |
| 2003/0235050 A1 | 12/2003 | West et al. |
| 2004/0146241 A1 | 7/2004 | Deladurantaye et al. |
| 2004/0161490 A1 | 8/2004 | Babin et al. |
| 2004/0213003 A1 | 10/2004 | Lauderdale et al. |
| 2004/0240217 A1 | 12/2004 | Rice |
| 2004/0246606 A1 | 12/2004 | Benitez et al. |
| 2005/0073840 A1 | 4/2005 | Chou et al. |
| 2005/0093430 A1 | 5/2005 | Ibbetson et al. |
| 2005/0111235 A1 | 5/2005 | Suzuki et al. |
| 2005/0168987 A1 | 8/2005 | Tamaoki et al. |
| 2005/0184638 A1 | 8/2005 | Mueller et al. |
| 2005/0210643 A1 | 9/2005 | Mezei et al. |
| 2005/0231812 A1 | 10/2005 | Leu et al. |
| 2006/0002101 A1 | 1/2006 | Wheatley et al. |
| 2006/0002146 A1 | 1/2006 | Baba |
| 2006/0033431 A1 | 2/2006 | Hsieh |
| 2006/0105485 A1 | 5/2006 | Basin et al. |
| 2006/0252169 A1 | 11/2006 | Ashida |
| 2006/0262521 A1 | 11/2006 | Piepgras et al. |
| 2007/0030675 A1* | 2/2007 | Oon .................. G03B 15/05 362/237 |
| 2007/0081780 A1 | 4/2007 | Scholl |
| 2007/0086179 A1 | 4/2007 | Chen et al. |
| 2007/0121340 A1 | 5/2007 | Hoshi |
| 2007/0189033 A1 | 8/2007 | Watanabe et al. |
| 2007/0201225 A1 | 8/2007 | Holder et al. |
| 2007/0245607 A1 | 10/2007 | Awai et al. |
| 2007/0253058 A1 | 11/2007 | Wood |
| 2007/0274654 A1 | 11/2007 | Choudhury et al. |
| 2008/0037284 A1 | 2/2008 | Rudisill |
| 2008/0079182 A1 | 4/2008 | Thompson et al. |
| 2008/0084693 A1 | 4/2008 | Shimada et al. |
| 2008/0151550 A1 | 6/2008 | Liu et al. |
| 2008/0165551 A1 | 7/2008 | Okada et al. |
| 2008/0169523 A1 | 7/2008 | Vigier-Blanc et al. |
| 2008/0186273 A1 | 8/2008 | Krijn et al. |
| 2008/0192458 A1 | 8/2008 | Li |
| 2008/0198604 A1 | 8/2008 | Kim et al. |
| 2008/0203415 A1 | 8/2008 | Thompson et al. |
| 2008/0273325 A1 | 11/2008 | Wilcox et al. |
| 2008/0273326 A1 | 11/2008 | Wilcox et al. |
| 2008/0285136 A1 | 11/2008 | Jacobowitz et al. |
| 2008/0298056 A1 | 12/2008 | Petersen |
| 2009/0008662 A1 | 1/2009 | Ashdown et al. |
| 2009/0039376 A1 | 2/2009 | Uemoto et al. |
| 2009/0109542 A1 | 4/2009 | Li et al. |
| 2009/0159915 A1 | 6/2009 | Branchevsky |
| 2009/0257242 A1 | 10/2009 | Wendman |
| 2009/0298376 A1 | 12/2009 | Guillien et al. |
| 2009/0309494 A1 | 12/2009 | Patterson et al. |
| 2010/0002449 A1 | 1/2010 | Lin |
| 2010/0014290 A1 | 1/2010 | Wilcox |
| 2010/0027257 A1 | 2/2010 | Boonekamp et al. |
| 2010/0046219 A1 | 2/2010 | Pijlman et al. |
| 2010/0073597 A1 | 3/2010 | Bierhuizen et al. |
| 2010/0079843 A1 | 4/2010 | Derichs et al. |
| 2010/0079980 A1 | 4/2010 | Sakai |
| 2010/0128483 A1 | 5/2010 | Reo et al. |
| 2010/0133422 A1 | 6/2010 | Lin et al. |
| 2010/0163909 A1 | 7/2010 | Chen et al. |
| 2010/0172135 A1 | 7/2010 | Holder et al. |
| 2010/0202142 A1 | 8/2010 | Morgan |
| 2010/0207140 A1 | 8/2010 | Rudaz et al. |
| 2010/0208460 A1 | 8/2010 | Ladewig et al. |
| 2010/0220484 A1 | 9/2010 | Shani et al. |
| 2010/0220497 A1 | 9/2010 | Ngai |
| 2010/0230693 A1 | 9/2010 | Tran |
| 2010/0231143 A1 | 9/2010 | May et al. |
| 2010/0238645 A1 | 9/2010 | Bailey |
| 2010/0238671 A1 | 9/2010 | Catone et al. |
| 2010/0264432 A1* | 10/2010 | Liu .................. H01L 25/0753 257/89 |
| 2010/0271708 A1 | 10/2010 | Wilcox |
| 2010/0271829 A1 | 10/2010 | Laporte |
| 2010/0302218 A1 | 12/2010 | Bita et al. |
| 2010/0302616 A1 | 12/2010 | Bita et al. |
| 2010/0302783 A1 | 12/2010 | Shastry et al. |
| 2010/0302803 A1 | 12/2010 | Bita et al. |
| 2010/0308356 A1 | 12/2010 | Wirth |
| 2010/0315833 A1 | 12/2010 | Holman et al. |
| 2010/0328936 A1 | 12/2010 | Pance et al. |
| 2011/0007505 A1 | 1/2011 | Wang |
| 2011/0026247 A1 | 2/2011 | Zhang et al. |
| 2011/0031516 A1 | 2/2011 | Basin et al. |
| 2011/0058372 A1 | 3/2011 | Lerman et al. |
| 2011/0063830 A1 | 3/2011 | Narendran et al. |
| 2011/0063838 A1 | 3/2011 | Dau et al. |
| 2011/0063857 A1 | 3/2011 | Li et al. |
| 2011/0069496 A1 | 3/2011 | Ing et al. |
| 2011/0103051 A1 | 5/2011 | Wilcox et al. |
| 2011/0110098 A1 | 5/2011 | Fu et al. |
| 2011/0157891 A1 | 6/2011 | Davis et al. |
| 2011/0163681 A1 | 7/2011 | Dau et al. |
| 2011/0163683 A1 | 7/2011 | Steele et al. |
| 2011/0164425 A1 | 7/2011 | Chen et al. |
| 2011/0170289 A1 | 7/2011 | Allen et al. |
| 2011/0176301 A1 | 7/2011 | Liang et al. |
| 2011/0180818 A1 | 7/2011 | Lerman et al. |
| 2011/0187273 A1 | 8/2011 | Summerford et al. |
| 2011/0193106 A1 | 8/2011 | Lerman et al. |
| 2011/0193114 A1 | 8/2011 | Lerman et al. |
| 2011/0195532 A1 | 8/2011 | Lerman et al. |
| 2011/0198631 A1 | 8/2011 | Lerman et al. |
| 2011/0198632 A1 | 8/2011 | Lerman et al. |
| 2011/0199769 A1 | 8/2011 | Bretschneider et al. |
| 2011/0204390 A1 | 8/2011 | Lerman et al. |
| 2011/0204391 A1 | 8/2011 | Lerman et al. |
| 2011/0210861 A1 | 9/2011 | Winton et al. |
| 2011/0228527 A1 | 9/2011 | Van Gorkom et al. |
| 2011/0242807 A1 | 10/2011 | Little, Jr. et al. |
| 2011/0267822 A1 | 11/2011 | Harbers et al. |
| 2011/0273882 A1 | 11/2011 | Pickard |
| 2011/0280014 A1 | 11/2011 | Householder et al. |
| 2011/0280043 A1 | 11/2011 | Van Ostrand et al. |
| 2011/0291548 A1 | 12/2011 | The et al. |
| 2011/0292658 A1 | 12/2011 | Ho |
| 2011/0299807 A1 | 12/2011 | Kim et al. |
| 2011/0304269 A1 | 12/2011 | Wang |
| 2011/0305018 A1 | 12/2011 | Angelini et al. |
| 2011/0305027 A1 | 12/2011 | Ham |
| 2011/0317436 A1 | 12/2011 | Kuan |
| 2012/0003343 A1 | 1/2012 | Armstrong et al. |
| 2012/0008338 A1 | 1/2012 | Ono et al. |
| 2012/0014115 A1 | 1/2012 | Park et al. |
| 2012/0019942 A1 | 1/2012 | Morgan |
| 2012/0026728 A1 | 2/2012 | Lou et al. |
| 2012/0033445 A1 | 2/2012 | Desmet et al. |
| 2012/0039073 A1 | 2/2012 | Tong |

(56) References Cited

U.S. PATENT DOCUMENTS

| | | |
|---|---|---|
| 2012/0051041 A1 | 3/2012 | Edmond et al. |
| 2012/0091487 A1 | 4/2012 | Chan et al. |
| 2012/0113676 A1 | 5/2012 | Van Dijk et al. |
| 2012/0126268 A1 | 5/2012 | Seo et al. |
| 2012/0132597 A1 | 5/2012 | Byalskiy et al. |
| 2012/0152490 A1 | 6/2012 | Wen et al. |
| 2012/0162783 A1* | 6/2012 | Bemmerl ............ G02B 19/0014 359/707 |
| 2012/0170266 A1 | 7/2012 | Germain et al. |
| 2012/0170280 A1 | 7/2012 | Choquet |
| 2012/0170316 A1 | 7/2012 | Lee et al. |
| 2012/0170318 A1 | 7/2012 | Tsai et al. |
| 2012/0182767 A1 | 7/2012 | Petcavich et al. |
| 2012/0201031 A1 | 8/2012 | Marley |
| 2012/0250296 A1 | 10/2012 | Lu et al. |
| 2012/0250319 A1 | 10/2012 | Dau et al. |
| 2012/0257383 A1 | 10/2012 | Zhang |
| 2012/0268931 A1 | 10/2012 | Lerman et al. |
| 2012/0268932 A1 | 10/2012 | Lerman et al. |
| 2012/0281404 A1 | 11/2012 | Wilcox et al. |
| 2012/0287654 A1 | 11/2012 | He et al. |
| 2012/0294011 A1 | 11/2012 | Cattoni et al. |
| 2012/0294037 A1 | 11/2012 | Holman et al. |
| 2012/0307495 A1* | 12/2012 | Shih .................. G02B 19/0066 362/237 |
| 2012/0307503 A1 | 12/2012 | Wilcox et al. |
| 2012/0319592 A1 | 12/2012 | Riesebosch |
| 2012/0319616 A1 | 12/2012 | Quilici et al. |
| 2012/0320626 A1 | 12/2012 | Quilici et al. |
| 2013/0010464 A1 | 1/2013 | Shuja et al. |
| 2013/0037838 A1 | 2/2013 | Speier et al. |
| 2013/0038219 A1 | 2/2013 | Dau et al. |
| 2013/0039050 A1 | 2/2013 | Dau et al. |
| 2013/0044480 A1 | 2/2013 | Sato et al. |
| 2013/0077298 A1 | 3/2013 | Steele et al. |
| 2013/0088890 A1 | 4/2013 | Knapp et al. |
| 2013/0107528 A1 | 5/2013 | Boyer et al. |
| 2013/0128593 A1 | 5/2013 | Luo |
| 2013/0148363 A1 | 6/2013 | Choquet et al. |
| 2013/0170210 A1 | 7/2013 | Athalye |
| 2013/0194799 A1 | 8/2013 | Wu et al. |
| 2013/0201715 A1 | 8/2013 | Dau et al. |
| 2013/0208461 A1 | 8/2013 | Warton et al. |
| 2013/0208495 A1 | 8/2013 | Dau et al. |
| 2013/0214300 A1 | 8/2013 | Lerman et al. |
| 2013/0215612 A1 | 8/2013 | Garcia |
| 2013/0223057 A1 | 8/2013 | Gassner et al. |
| 2013/0229804 A1 | 9/2013 | Holder et al. |
| 2013/0229810 A1 | 9/2013 | Pelka et al. |
| 2013/0250584 A1 | 9/2013 | Wang et al. |
| 2013/0279198 A1 | 10/2013 | Lin et al. |
| 2013/0294059 A1 | 11/2013 | Galluccio et al. |
| 2013/0294063 A1 | 11/2013 | Lou et al. |
| 2013/0343045 A1 | 12/2013 | Lodhie et al. |
| 2013/0343055 A1 | 12/2013 | Eckert et al. |
| 2013/0343079 A1 | 12/2013 | Unger et al. |
| 2014/0003041 A1 | 1/2014 | Dau et al. |
| 2014/0029114 A1 | 1/2014 | Kim |
| 2014/0029257 A1 | 1/2014 | Boyer et al. |
| 2014/0071687 A1 | 3/2014 | Tickner et al. |
| 2014/0111984 A1 | 4/2014 | Rodgers et al. |
| 2014/0126206 A1 | 5/2014 | Wilcox et al. |
| 2014/0160724 A1* | 6/2014 | Lerman .............. G02B 19/0014 362/84 |
| 2014/0168955 A1 | 6/2014 | Gershaw |
| 2014/0268810 A1 | 9/2014 | Marquardt et al. |
| 2014/0268879 A1 | 9/2014 | Mizuyama et al. |
| 2014/0334126 A1 | 11/2014 | Speier et al. |
| 2015/0003059 A1* | 1/2015 | Haitz .................. F21K 9/60 362/235 |

FOREIGN PATENT DOCUMENTS

| | | |
|---|---|---|
| DE | 10047101 A1 | 5/2002 |
| DE | 10047101 C2 | 9/2002 |
| DE | 10203106 A1 | 7/2003 |
| DE | 10302563 A1 | 7/2004 |
| DE | 10302564 A1 | 7/2004 |
| DE | 102006009325 A1 | 9/2007 |
| DE | 102006011296 A1 | 9/2007 |
| DE | 102006013343 A1 | 9/2007 |
| DE | 202014100462 U1 | 3/2014 |
| EP | 1167870 A2 | 1/2002 |
| EP | 1657758 A2 | 5/2006 |
| EP | 2495096 A2 | 9/2012 |
| JP | 03019818 A | 1/1991 |
| JP | H0319818 A | 1/1991 |
| JP | H03138147 A | 6/1991 |
| JP | H03142207 A | 6/1991 |
| JP | 10173870 A | 6/1998 |
| JP | 2000147264 A | 5/2000 |
| JP | 2001191365 A | 7/2001 |
| JP | 3093080 U | 4/2003 |
| WO | 9621122 A1 | 7/1996 |
| WO | 9621884 A1 | 7/1996 |
| WO | 9904531 A1 | 1/1999 |
| WO | 03031869 A1 | 4/2003 |
| WO | 2008076399 A2 | 6/2008 |
| WO | 2008076399 A3 | 6/2008 |
| WO | 2008102655 A1 | 8/2008 |
| WO | 2009012484 A1 | 1/2009 |
| WO | 2010095068 A2 | 8/2010 |
| WO | 2011091529 A1 | 8/2011 |
| WO | 2011130648 A2 | 10/2011 |
| WO | 2011130648 A3 | 10/2011 |
| WO | 2012147342 A1 | 11/2012 |
| WO | 2013078463 A1 | 5/2013 |
| WO | 2013082537 A1 | 6/2013 |
| WO | 2014120671 A1 | 8/2014 |
| WO | 2014120672 A2 | 8/2014 |
| WO | 2014120672 A3 | 8/2014 |
| WO | 2014120925 A1 | 8/2014 |
| WO | 2014120968 A1 | 8/2014 |
| WO | 2014120969 A1 | 8/2014 |
| WO | 2014144465 A1 | 9/2014 |
| WO | 2014144503 A1 | 9/2014 |
| WO | 2015199853 A1 | 12/2015 |
| WO | 2016007231 A1 | 1/2016 |

OTHER PUBLICATIONS

Beich, William, et al., "Plastic Optics," Photonics Handbook, Nov. 3, 2015, www.photonics.com/EDU/Handbook.aspx?AID=25487, Photonics Media, 6 pages.

Ijima, Ryuta, et al., "Document scanner using polymer waveguides with a microlens array," Optical Engineering, vol. 41, Issue 11, Nov. 2002, pp. 2743-2748.

Ji, Hee-Su, et al., "Electrically controllable microlens array fabricated by anisotropic phase separation from liquid-crystal and polymer composite materials," vol. 28, Issue 13, Optics Letters, Jul. 2003, pp. 1147-1149.

Stricker, Michael, et al., "Focus on Precision," Injection Molding Optical Components, translated from Kunststoffe, Apr. 2009, pp. 30-34.

Non-Final Office Action for U.S. Appl. No. 13/843,928, dated Jul. 13, 2015, 30 pages.

Final Office Action for U.S. Appl. No. 13/843,928, dated Nov. 10, 2015, 24 pages.

Non-Final Office Action for U.S. Appl. No. 13/843,928, dated Mar. 18, 2016, 22 pages.

Final Office Action for U.S. Appl. No. 13/843,928, dated Aug. 2, 2016, 21 pages.

Advisory Action and Examiner-Initiated Inteview Summary for U.S. Appl. No. 13/843,928, dated Nov. 8, 2016, 5 pages.

Non-Final Office Action for U.S. Appl. No. 13/843,928, dated Mar. 2, 2017, 32, pages.

(56) References Cited

OTHER PUBLICATIONS

Final Office Action for U.S. Appl. No. 13/843,928, dated Oct. 11, 2017, 31 pages.
Advisory Action and Examiner-Initiated Inteview Summary for U.S. Appl. No. 13/843,928, dated Jan. 18, 2018, 5 pages.
Non-Final Office Action for U.S. Appl. No. 13/843,928, dated Mar. 29, 2018, 33 pages.
Final Office Action for U.S. Appl. No. 13/843,928, dated Sep. 17, 2018, 36 pages.
Advisory Action and Examiner-Initiated Interview Summary for U.S. Appl. No. 13/843,928, dated Nov. 26, 2018, 5 pages.
Notice of Allowance and Examiner-Initiated Interview Summary for U.S. Appl. No. 13/843,928, dated Mar. 13, 2019, 19 pages.
Non-Final Office Action for U.S. Appl. No. 14/638,242, dated Apr. 21, 2016, 11 pages.
Final Office Action for U.S. Appl. No. 14/638,242, dated Dec. 30, 2016, 14 pages.
Non-Final Office Action for U.S. Appl. No. 14/638,242, dated Jul. 10, 2017, 9 pages.
Notice of Allowance for U.S. Appl. No. 14/638,242, dated Nov. 16, 2017, 7 pages.

\* cited by examiner

OPTIC MEMBER FOR AN LED LIGHT FIXTURE

RELATED APPLICATION

This application is a continuation of patent application Ser. No. 13/843,928, filed Mar. 15, 2013, now U.S. Pat. No. 10,400,984, issued Sep. 3, 2019. The entirety of the contents of patent application Ser. No. 13/843,928 is incorporated herein by reference.

FIELD OF THE INVENTION

The invention relates generally to the field of LED (light emitting diode) light fixtures and, more particularly, to secondary lenses for directing light from LED light sources, and, still more particularly, to polymeric lenses for LED light fixtures.

BACKGROUND OF THE INVENTION

There is a need for lighting apparatus for a variety of general lighting purposes which is low-cost and energy-efficient. LED light sources are energy-efficient, and advances in LED technology are providing even greater efficiencies over time. One important aspect of LED light fixtures is the so-called secondary lensing that directs light received from LED light sources. As used herein, the term "LED light source" refers to an LED or a small grouping of LEDs alone, or more typically to what is referred to as an LED package—namely, an LED (or small grouping of LEDs) with what is referred to as a primary lens formed thereon. Secondary lenses, which receive and direct light from LED light sources, are of significant importance to LED light fixtures in many ways.

Secondary lenses play a major role, of course, in the direction of light from a light fixture, and so determine the degree and spread of illumination, and overall optical efficiency. The forming and shaping of secondary lenses are typically important considerations with respect to the usefulness of an LED fixture, and play a significant role in overall product cost. Improvements in secondary lenses, their optical capabilities, and their manufacture are important considerations in the field of LED light fixtures.

LED light fixtures for a wide variety of both specific and general lighting applications typically have a plurality of LED light sources, usually positioned in spaced relationship to one another on a board (e.g., a circuit board), and a secondary lens is aligned with each LED light source. Such secondary lenses are in some cases part of a unitary member that has a plurality of secondary lens portions each surrounded by and interconnected by a non-lens portion. Improvements in such multi-secondary-lens members, the optical capabilities of the secondary lens portions, and the manufacture of such members are important considerations in the field of LED light fixtures. More specifically, speed (and therefore cost) and accuracy of manufacture are particularly important considerations.

It would be highly beneficial to provide an improved unitary optical member and LED secondary lensing which are low-cost, highly accurate and useful in directing LED light, and which contribute to the overall economy and efficiency of LED light fixtures.

SUMMARY OF THE INVENTION

The present invention is an improved secondary lens and improved unitary optic member for LED light fixtures and a method of manufacture. These address the above-noted needs, concerns and considerations and serve to improve product quality and efficiency and reduce manufacturing costs of high-performance LED light fixtures.

One aspect of the invention is a unitary optic member for directing light from a plurality of LED light sources in spaced relationship to one another on a board beneath the optic member, the optic member having a plurality of lens portions each for directing light from one of the plurality of LED light sources, the lens portions being surrounded by and interconnected by a non-lens portion. The optic member comprises: a first molded polymeric layer forming the non-lens portion and the outermost layer of each of the lens portions, the outermost layer of each lens portion forming a pocket-space at such lens portion; and for each lens portion, a second molded polymeric layer overmolded onto the first polymeric layer within the corresponding pocket-space.

In certain embodiments, the first and second polymeric layers of the unitary optic member are of different polymeric materials. In some such embodiments, the first layer is an acrylic layer and the second layer is a cured liquid silicone resin (LSR) layer, and in such of these embodiments the second layer is the innermost layer. Use of an LSR later as the innermost layer tends to allows excellent precision in the intended light-directing functions of the lens portions of the unitary optic member, even while providing time- and cost-related manufacturing advantages.

In certain embodiments, the first molded polymeric layer is injection-molded, and in some other embodiments it is thermoformed.

In some embodiments, the unitary optic member also includes a third molded polymeric layer overmolded onto the second polymeric layer within the corresponding pocket-space, such third molded polymeric layer being the innermost layer. In some of such embodiments, the third layer is an LSR layer.

In certain embodiments, the contacting layers are of polymeric materials having different indices of refraction. Such refraction-index differences provide additional light-directing advantages for the lens portions of the unitary optic member.

Another aspect of this invention is a unitary multi-lens-portion optic member of the type described which includes: a molded polymeric layer that forms the outermost layer of each of the lens portions and also forms non-lens portion between the lens portions; and for each lens portion another molded polymeric layer, the polymeric layers being overmolded to one another. As already noted, in certain embodiments the first molded polymeric layer is injection-molded and in some other embodiments it is thermoformed. Any plastic forming method to produce such molded (i.e., formed) layer may be acceptable.

Still another aspect of this invention is a method for manufacturing a unitary optic member having plural lens portions surrounded by and interconnected by a non-lens portion. The method includes the steps of: forming a first molded polymeric layer including the non-lens portion and an outermost layer of each of the lens portions, such forming step including forming a pocket-space at each lens portion; and, for each lens portion, injection-molding a second molded polymeric layer onto the first polymeric layer within the corresponding pocket-space.

In certain embodiments, the first molded polymeric layer is formed by injection-molding, and in some other embodiments it is formed by thermoforming using a thermoforming press.

In some embodiments of the method of this invention, each of the lens portions further includes overmolding a third molded polymeric layer onto the second polymeric layer within the corresponding pocket-space, the third molded polymeric layer becoming the innermost layer.

Yet another aspect of this invention is a multi-layer polymeric lens for directing light from an LED light source, the lens having at least an innermost layer and an outermost layer and defining a lens optical footprint, wherein the innermost layer is less than coextensive with the lens optical footprint. As used herein, the term "lens optical footprint" means the largest light-passage area within the lens and orthogonal to the axis of the light source. The adjacent layers are joined together permanently at their interface such as by overmolding.

The multi-layer aspect of this invention reduces overall processing time in lens manufacture because multiple thin layers (thinner than the entire lens) cool faster than is the case for a one-layer lens of the same shape. Furthermore, such layering and related cycle time advantages reduce lens distortion, a factor of particular importance for lenses with complex shapes—such as inner-surface shapes. This invention is based in part on the recognition that use of a layer which is less than coextensive with the lens optical footprint facilitates manufacture of complex LED secondary lenses.

The outermost layer may include a flange extending beyond the lens optical footprint. In certain embodiments, the innermost and outermost layers of the multi-layer polymeric lens are of an acrylic. In some embodiments, the two layers have different indices of refraction.

In some embodiments of the invention, the multi-layer polymeric lens of this invention includes an intermediate layer between the innermost and outermost layers. Adjacent layers of the multi-layer polymeric lens are joined together permanently at their interface such as by overmolding. The innermost, intermediate, and outermost layers may be an acrylic. The layers may be of particular polymeric materials having different indices of refraction, for the light-directing reasons noted above.

A related aspect of this invention is an improved LED light fixture of the type including (a) a heat-sink structure having a mounting surface, (b) a circuit board on the mounting surface and having a plurality of LED light sources spaced thereon, and (c) an optic member over the circuit board and having a plurality of secondary lenses thereon each in alignment with a corresponding one of the light sources. In the improvement, the optic member is a unitary optic member which comprises: a first molded polymeric layer forming (a) the non-lens portion and (b) an outermost layer of each of the lens portions, the outermost layer of each lens portion forming a pocket-space at such lens portion; and for each lens portion, a second molded polymeric layer overmolded onto the first polymeric layer within the corresponding pocket-space.

Still another aspect of this invention is a multi-layer polymeric lens for directing light from an LED light source, the lens defining a lens optical footprint, and at least one of the layers being less than coextensive with the lens optical footprint. In some embodiments, another of the layers includes a flange extending beyond the lens optical footprint.

As used herein in describing the optic member, the term "unitary" means that the optic member is a single piece with its polymeric layers being formed at different times, a successive layer (or layers) being overmolded onto a previous layer (or layers) such that each layer-to-layer interface is bonded in the overmolding process.

As used herein, the term "outermost layer" refers to the layer farthest from the LED light source, or at least the last layer through which light from such light source passes. And the term "innermost layer" refers to the layer closest to the LED light source, or at least the first layer through which light from such light source passes.

In descriptions of this invention, including in the claims below, the terms "comprising," "including" and "having" (each in their various forms) and the term "with" are each to be understood as being open-ended, rather than limiting, terms.

DETAILED DESCRIPTION OF EXEMPLARY EMBODIMENTS

Referring in more detail to the drawings of the exemplary embodiments, FIGS. 1-9 illustrate a unitary optic member 10 in accordance with this invention. Unitary optic member 10 has five lens portions 12 which are surrounded by and interconnected by a non-lens portion 14.

Figure 1:
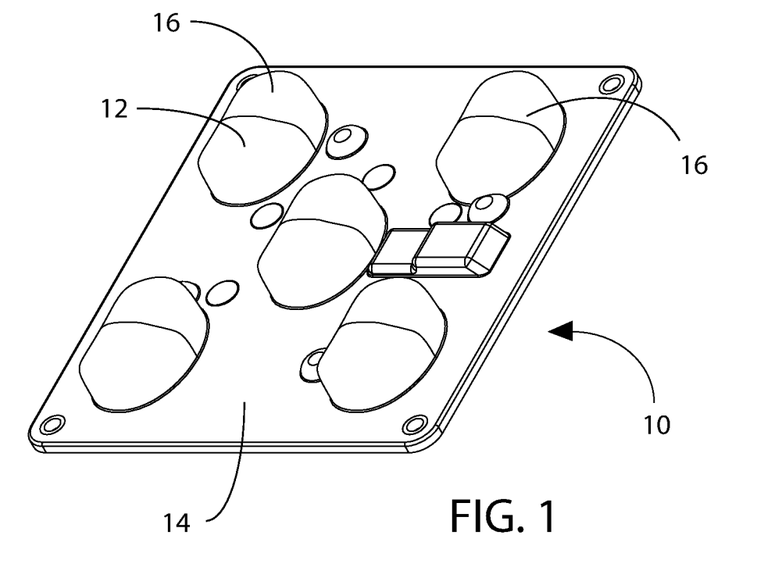
FIG. 1 is a perspective view of a unitary optic member in accordance with this invention, showing its light-output side.
Figure 2:
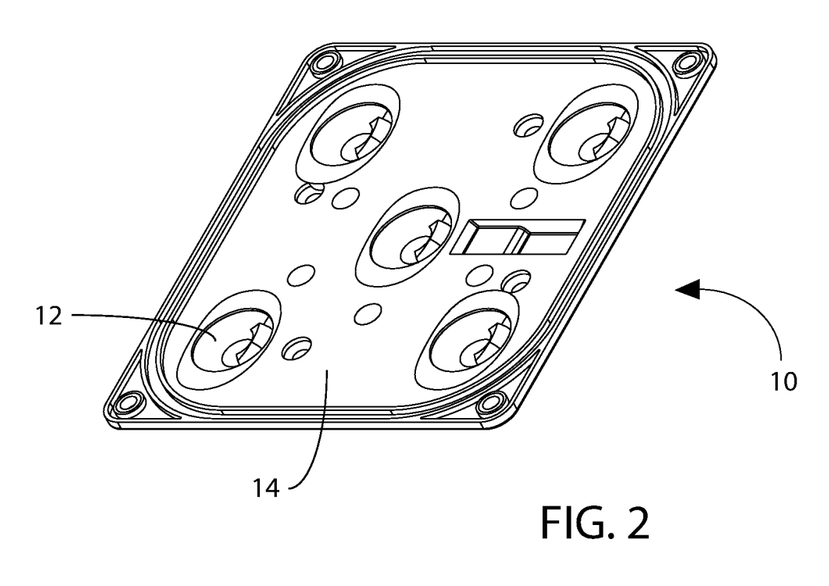
FIG. 2 is a perspective view of such unitary optic member, but showing its light-input side.
Figure 3:
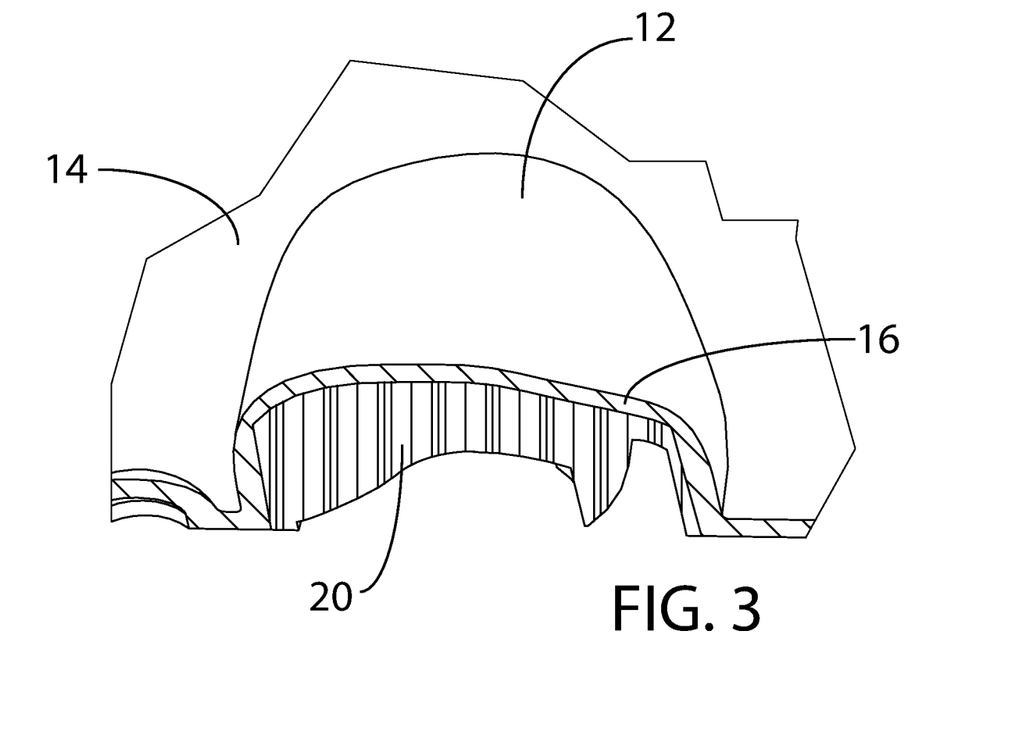
FIG. 3 is an enlarged fragmentary sectional perspective view, showing for one lens the first molded polymeric layer and the second molded polymeric layer overmolded onto the first layer within a pocket-space formed in the first molded layer.
Figure 4:
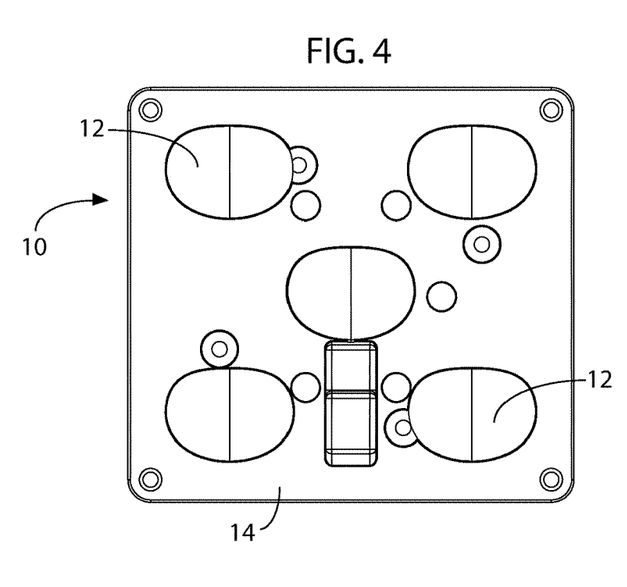
FIG. 4 is a top plan view of such unitary optic member.
Figure 5:
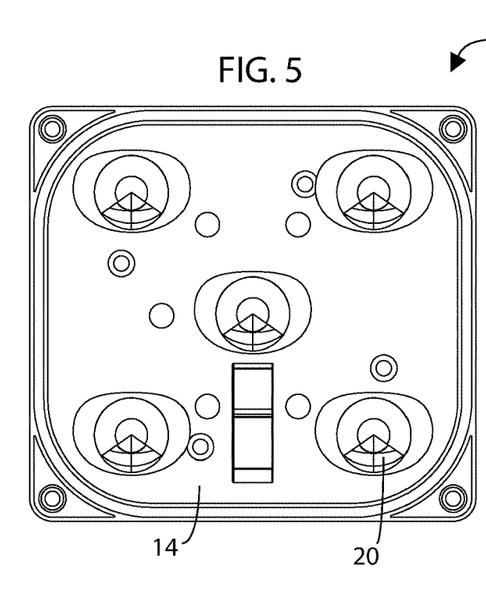
FIG. 5 is a bottom plan view.
Figure 6:
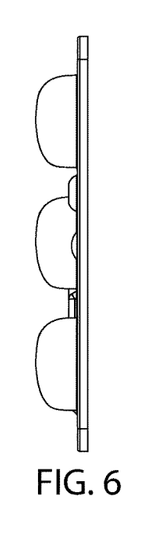
FIGS. 6 and 7 are side elevations taken from two adjacent sides of the unitary optic member.
Figure 7:
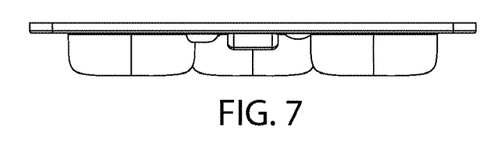
Figure 8:
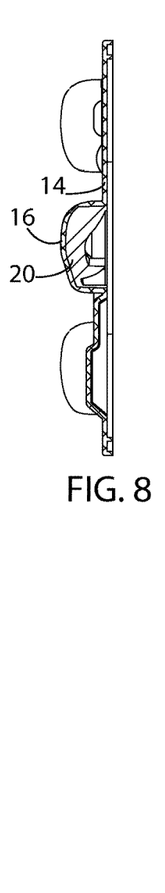
FIG. 8 is a side sectional view taken along section 8-8 as indicated in FIG. 4.

Unitary optic member 10 includes a first molded polymeric layer which forms non-lens portion 14 and the outermost layer 16 of each lens portion 12. Outermost layer 16 of each lens portion 12 forms a pocket-space 18 at such lens portion. For each portion 12, a second molded polymeric layer 20 is overmolded onto the first polymeric layer within corresponding pocket-space 18.

While the first and second polymeric layers of unitary optic member 10 can be of the same polymeric material, in this embodiment the first and second polymeric layers are of different polymeric materials. More specifically, non-lens portion 14 and outermost layer 16 (of each lens portion 12)

is an acrylic, and second polymeric layer 20 is an LSR. A wide variety of optical-grade acrylics can be used, and are available from various sources, including: Mitsubishi Rayon America, Inc.; Arkema Group; and Evonik Cyro LLC. Likewise, a wide variety of optical-grade LSRs can be used, and are available from various sources, such as: The Dow Chemical Company; Wacker Chemie AG; and Momentive Performance Materials Products. Some optical-grade acrylics useful in this invention have an index of refraction of 1.49, and some optical-grade LSR materials have an index of refraction of 1.41.

Figure 9:
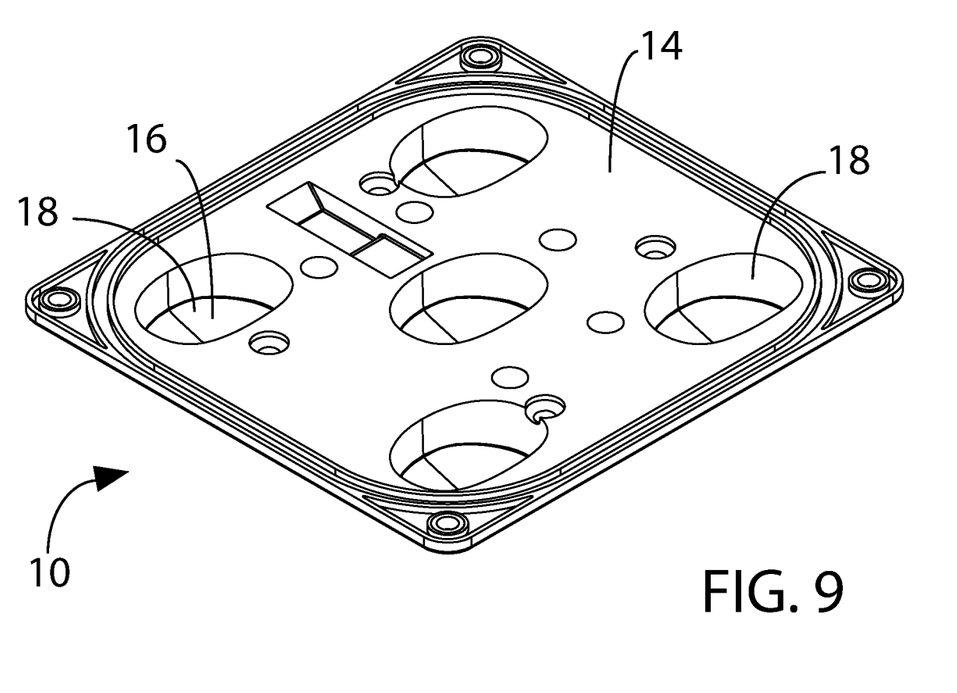
FIG. 9 is a perspective view of the first molded polymeric layer prior to, for each lens portion, the overmolding of the second molded polymeric layer.

The first molded polymeric layer, including its non-lens portion 14 and the outermost layer of each of lens portions 14, is injection-molded, although as noted above other processes to preform such first molded polymeric layer, such as thermoforming, can be used. FIG. 9 illustrates the first molded polymeric member and five pocket spaces 18 which it forms prior to overmolding of second polymeric layer 20 within each of pocket spaces 18. For such overmolding, the first molded polymeric layer is placed in a mold and, for each pocket space 18, lens portions 12 are made by injection molding the second polymeric layer into spaces 18.

FIG. 3 clearly illustrates outermost layer 16 and second polymeric layer 20 of one of lens portions 12. Such lens portions are two-layered lenses.

Figure 10:
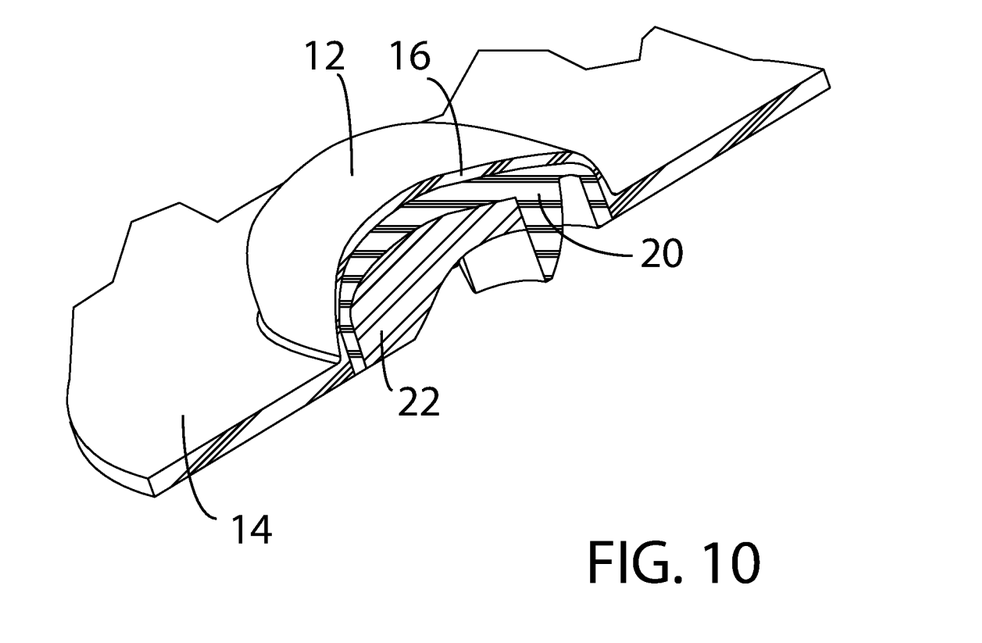
FIG. 10 is an enlarged fragmentary sectional perspective view, as in FIG. 3, but illustrating an embodiment having a third molded polymeric layer as the innermost layer.
Figure 11:
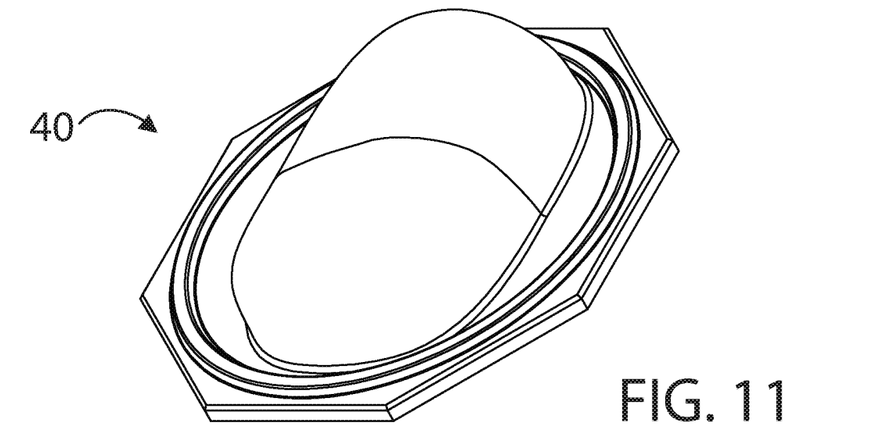
FIG. 11 is a perspective view of the three-layer polymeric lens of FIG. 10, showing its light-output side.
Figure 12:
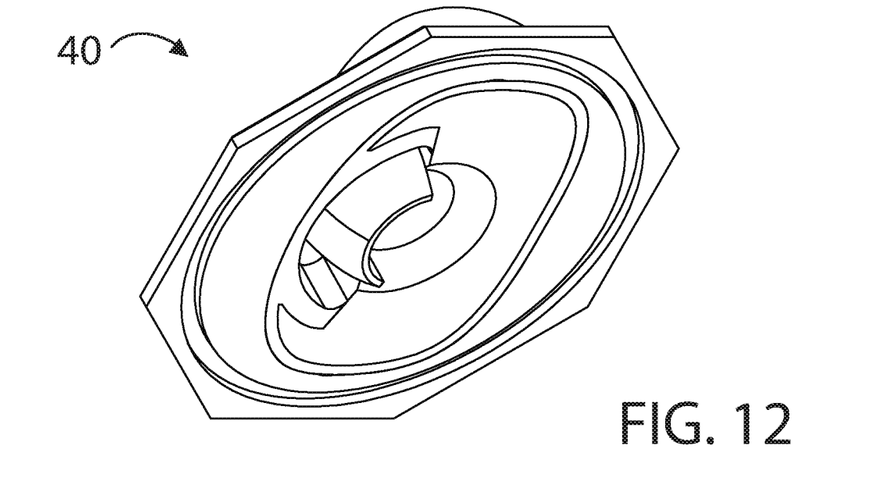
FIG. 12 is a perspective view of the lens of FIG. 11, but showing its light-input side.
Figure 13:
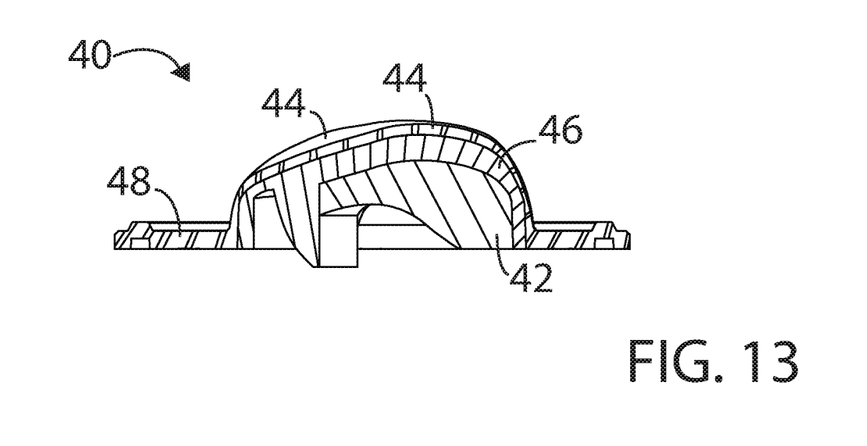
FIG. 13 is a central cross-sectional view of the lens of FIG. 11, illustrating the three layers of the lens.
Figure 14:
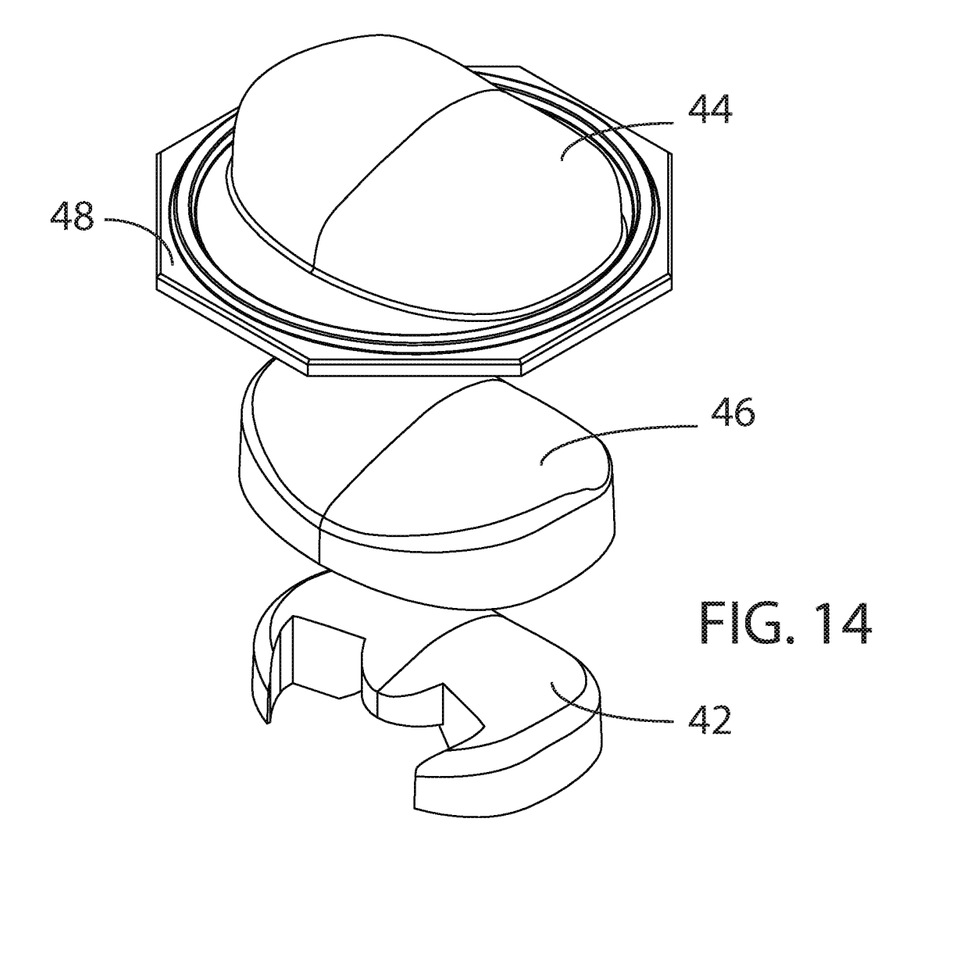
FIG. 14 is an exploded perspective view of such three-layer lens, serving to illustrate the shapes of the layers.

An alternative embodiment in which the lens portions are three-layered lenses is illustrated in FIG. 10, which is a view similar to that of FIG. 3. As can be seen in FIG. 10, the unitary optic member includes a third molded polymeric layer 22 which is overmolded onto second polymeric layer 20, also within corresponding pocket-space 18. Third molded polymeric layer, which is made by a subsequent injection-molding step immediately after the injection molding of second polymeric layer 20, is the innermost layer of the lens portion. Third molded polymeric layer 22 may be of the same polymeric materials as the other two layers, or the layers may have differing polymeric materials, including materials with differing indices of refraction. Third molded polymeric layer 22 may be an LSR layer.

Figure 15:
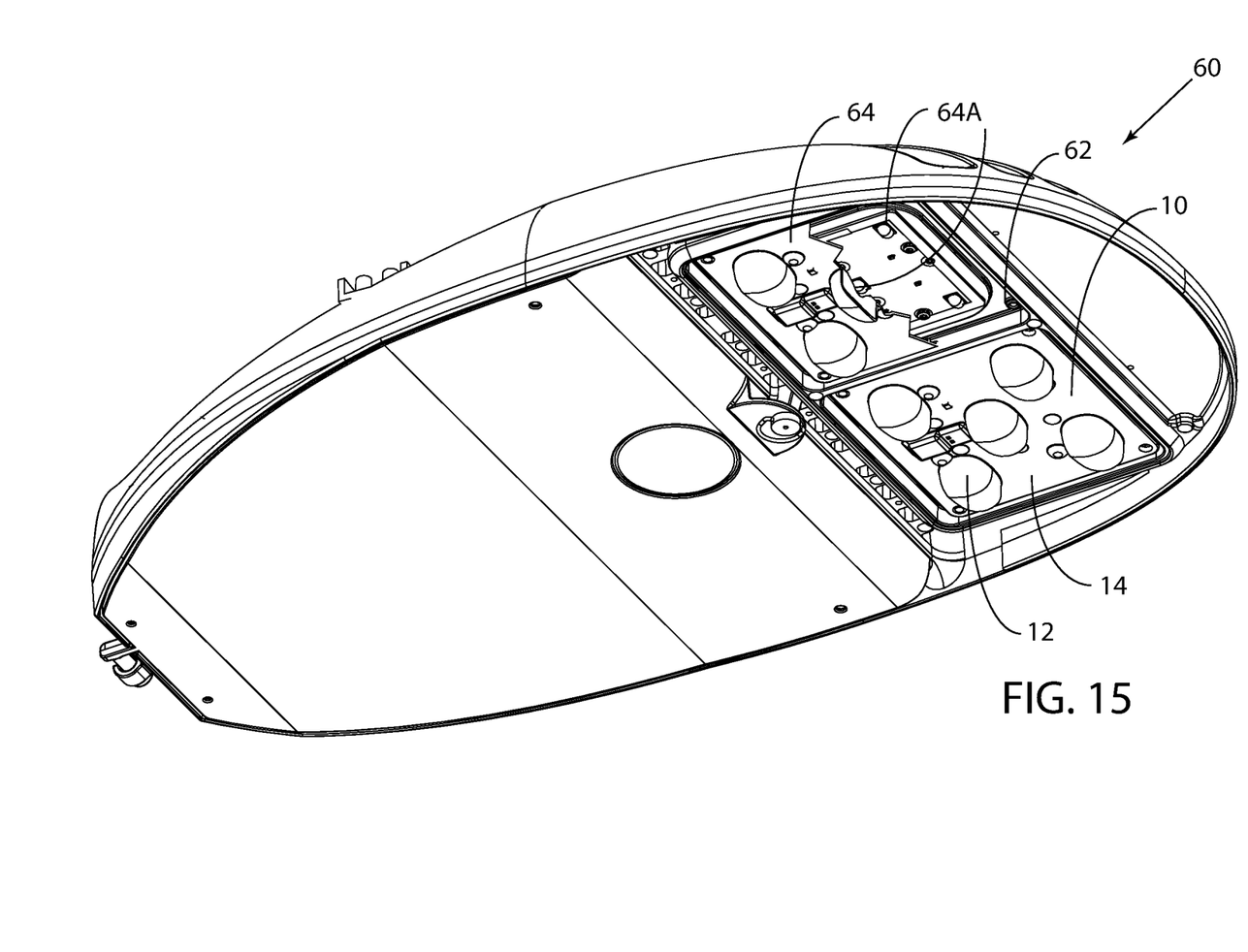
FIG. 15 is a partially broken-away perspective view of an LED light fixture in accordance with this invention.

FIG. 15 illustrates an improved LED light fixture 60 which utilizes two unitary optic members 10 of the type described above. FIG. 15 shows a circuit board 64 which is mounted on a heat sink 62, specifically on a surface thereof for circuit-board mounting. The circuit board has a plurality of LED light sources 64A spaced thereon, and each unitary optic member 10 has lenses 60 each in alignment with a corresponding one of light sources 64A. Unitary optic members 10 are as described in detail above.

FIGS. 11-14 illustrate another aspect of this invention. Such figures show a multi-layer polymeric lens 40 for directing light from an LED light source. Lens 40 of this embodiment has three layers, including an innermost layer 42, an outermost layer 44, and an intermediate layer 46. This is seen best in FIG. 13, and the layer shapes are illustrated in the FIG. 14 exploded view. As seen well in FIGS. 13 and 14, in lens 40, the optical footprint of the area receiving light from the LED light source by the outer surface of the innermost layer 42 is less than coextensive with the optical footprint of the area receiving light from the LED light source by the inner surface of the intermediate layer 46. The term "an optical footprint" means a projection on a two-dimensional surface orthogonal to the axis of the LED light source.

Outermost layer 44 of lens 40 includes a flange 48 extending beyond the optical footprint of lens 40.

The layers of each pair of adjacent layers of lens 40 are joined together permanently at their interface by overmolding. Lens 40 may be formed by a series of injection-molding steps. For example, innermost layer 42 is first formed by injection molding. Then, at the next injection-molding station, intermediate layer 46 is overmolded with innermost layer 42. And then, at a third injection-molding station, outermost layer 44 is overmolded onto the previously overmolded layers.

The layers of lens 40, as with respect to the layers illustrated best in FIGS. 3 and 10, may be of the same or differing polymeric materials. And injection-moldable materials may be chosen having different indices of refraction.

While the principles of this invention have been described in connection with specific embodiments, it should be understood clearly that these descriptions are made only by way of example and are not intended to limit the scope of the invention.

The invention claimed is:

1. An optic member for directing light from a plurality of LED light sources in spaced relationship to one another on a board beneath the optic member, the optic member having a plurality of lenses each for directing light from one of the plurality of LED light sources, the optic member comprising:
    a first layer of material forming an outermost surface of each of the lenses and a non-lens portion extending from each outermost surface and interconnecting the plurality of lenses; and
    each of the lenses having a light-receiving inner-surface defining a pair of cavities with at least a portion of a second layer of material extending inwardly between the cavities, a third layer of material at least partially forming a portion of the light-receiving inner-surface which defines one of the cavities;
    wherein the third layer is an innermost layer.

2. The optic member of claim 1 wherein the first layer forms, at each lens, a pocket-space that comprises the second and third layer of each lens within, the second and third layers each being molded polymeric layers.

3. The optic member of claim 1 wherein the third layer is an LSR layer.

4. The optic member of claim 1 wherein at least two of the layers have different indices of refraction.

5. An optic member for directing light from a plurality of LED light sources in spaced relationship to one another on a board beneath the optic member, the optic member having a plurality of lenses each for directing light from one of the plurality of LED light sources, the optic member comprising:
    a first layer of material forming an outermost surface of each of the lenses and a non-lens portion extending from each outermost surface and interconnecting the plurality of lenses; and
    each of the lenses having a light-receiving inner-surface defining a pair of cavities with at least a portion of a second layer of material extending inwardly between the cavities, a third layer of material at least partially forming a portion of the light-receiving inner-surface which defines one of the cavities;
    wherein the first and second layers are of different polymeric materials.

6. The optic member of claim 5 wherein the first layer is an acrylic layer and the third layer is an LSR layer.

7. An LED light fixture comprising:
    a plurality of LED light sources spaced on a mounting surface; and
    an optic member over the plurality of LED light sources and comprising a plurality of lenses interconnected by a non-lens portion, each of the plurality of lenses having a light-receiving inner-surface which defines a pair of cavities with at least a portion of one optical layer extending inwardly between the cavities and another optical layer at least partially forming a portion of the light-receiving inner-surface which defines one of the cavities;

wherein the another optical layer is an innermost layer, and the layers are of different polymeric materials.

8. The LED light fixture of claim 7 wherein the another optical layer is an LSR layer.

9. The LED light fixture of claim 7 wherein the non-lens portion of the optic member is formed by a layer forming, at each lens, a pocket-space that comprises the optical layer and the another optical layer of each lens within.

10. The LED light fixture of claim 7 wherein at least two of the non-lens portion, the optical layer, and the another optical layer have different indices of refraction.

11. A lens for directing light from a light source, the lens being formed by a plurality of layers and comprising an inner surface defining a pair of cavities with at least a portion of one optical layer extending inwardly between the cavities and a portion of the inner surface which defines one of the cavities being at least partially formed by an innermost layer of the plurality of layers, wherein the innermost layer is an LSR layer.

12. The lens of claim 11 wherein at least two of the layers have different indices of refraction.

13. An optic member for directing light received from a plurality of spaced apart LED light sources, the optic member comprising a plurality of lenses each formed by a plurality of polymeric layers, each of the plurality of lenses having an inner-surface defining a pair of cavities with at least a portion of one of the plurality of layers extending inwardly between the cavities and a portion of the inner surface which defines one of the cavities being at least partially formed by an innermost layer of the plurality of layers.

14. The optic member of claim 13 wherein the innermost layer is an LSR layer.

15. The optic member of claim 13 wherein each of the lenses comprises an outermost layer of an acrylic.

16. The optic member of claim 13 wherein at least two of the plurality of layers have different indices of refraction.

\* \* \* \* \*